United States Patent [19]
Hardy et al.

[11] Patent Number: 5,522,566
[45] Date of Patent: Jun. 4, 1996

[54] FIGHTER AIRCRAFT HAVING LOW AERODYNAMIC DRAG AND LOW RADAR SIGNATURE CONFIGURATION

[75] Inventors: Richard Hardy, Seattle; Frank D. Neumann, Bellevue; Dennis E. Ruzicka, Enumclaw, all of Wash.

[73] Assignee: The Boeing Company, Seattle, Wash.

[21] Appl. No.: 288,637

[22] Filed: Aug. 10, 1994

Related U.S. Application Data

[63] Continuation of Ser. No. 12,224, Feb. 2, 1993, abandoned.

[51] Int. Cl.⁶ ......................................................... B64D 1/02
[52] U.S. Cl. ........................ 244/137.1; 244/130; 244/15; 244/53 B; 244/36; 89/1.54; 89/1.815
[58] Field of Search ..................... 244/15, 53 B, 244/137.1, 137.4, 118.1; 89/1.54, 1.815, 1.816, 36

[56] References Cited

U.S. PATENT DOCUMENTS

| | | | |
|---|---|---|---|
| 1,664,899 | 4/1928 | Ries | 89/1.54 |
| 2,709,947 | 6/1955 | Woods | 89/1.815 |
| 2,731,885 | 1/1956 | Nolan | 89/1.815 |
| 2,787,938 | 4/1957 | Bach | 89/1.816 |
| 2,841,346 | 7/1958 | Petter | 244/117 R |
| 2,958,260 | 11/1960 | Anderson | 89/1.815 |
| 2,998,209 | 8/1961 | Creasey et al. | 244/15 |
| 4,208,949 | 6/1980 | Boilsen | 244/137.4 |
| 4,232,515 | 11/1980 | Brown | 244/53 B |
| 4,579,300 | 4/1986 | Carr | 244/53 B |
| 4,697,764 | 10/1987 | Hardy et al. | 244/137.4 |
| 4,781,342 | 11/1988 | Hardy et al. | 244/137.4 |

FOREIGN PATENT DOCUMENTS

| | | | |
|---|---|---|---|
| 1285494 | 11/1989 | Japan | 244/53 B |
| 1301496 | 12/1989 | Japan | 244/53 B |

OTHER PUBLICATIONS

ATF Prototypes Outstrip F–15 In Size and Thrust, Michael A. Dornheim, Sep. 17, 1990, Aviation Week & Space Technology pp. 44, 45, 47, 48, 49 & 50.

*Primary Examiner*—Galen L. Barefoot
*Attorney, Agent, or Firm*—John C. Hammar

[57] ABSTRACT

A fighter aircraft achieves low aerodynamic drag and radar signature without sacrificing flight performance through a unique arrangement of the main weapons bay, the auxiliary weapons bays, and the main landing gear. Separate main and auxiliary weapons bays permit a narrower fuselage than could be obtained with a single common bay. Also, the auxiliary weapons bays and the landing gear can be aligned outboard of the main weapons bay without needing to increase the length or width of the aircraft. The air intake ducts extend aft from the intake and curve upwardly and inwardly over the main weapons bay. The result of the design configuration is an aircraft which has a forward aspect reduced to the minimum necessary to accommodate the components that need forward visibilities, which translates to minimum aerodynamic drag and radar signature.

16 Claims, 3 Drawing Sheets

FIGHTER AIRCRAFT HAVING LOW AERODYNAMIC DRAG AND LOW RADAR SIGNATURE CONFIGURATION

REFERENCE TO RELATED APPLICATION

The present application is a continuation of application No. 08/012,224, filed Feb. 2, 1993, now abandoned.

DESCRIPTION

1. Field of the Invention

This invention relates to fighter aircraft, and more particularly to an arrangement of the components of fighter aircraft, including its engine inlets and ducts, weapons bays, landing gear, canopy and forward-looking radar dome, to minimize the drag and radar signature of the aircraft.

2. Description of the Prior Art

Optimizing the design of modern fighter aircraft generally requires trade-offs between a number of competing design goals. For example, it is important to place several components of the aircraft at or near the aircraft's center of gravity. The weapons bay should be near the aircraft's center of gravity so that the flight characteristics of the airplane do not vary when the weapons are deployed. This consideration is particularly important for the larger, and hence heavier weapons, carried by the airplane. Similarly, the main landing gear should be just slightly behind the airplane's center of gravity so that it is possible to rotate the airplane at relatively low takeoff speeds. The relatively large size of these components generally precludes them all from being located at the airplane's center of gravity.

Minimizing the airplane's drag and radar signature imposes other compromises in optimizing the location of the airplane's components. There are only three basic components of a modern fighter airplane that must have forward visibility. These components are the canopy (so that the pilot can look ahead), the radar dome (so that radar signals can be detected from in front of the airplane) and the air inlets (so that ram air will enter the engine). Radar guided missiles, particularly of the "lock-on-before-launch" variety, must also have forward visibility, but these missiles can be moved from a stowed position to a foward-looking deployed position just prior to launch. Any other components of the airplane that are visible from in front of the airplane will have a tendency to increase both the airplane's drag and its radar signature.

It is often not possible to confine the frontal aspect of fighter airplanes to the combined frontal aspects of the canopy, the radar dome and the engine air inlets. For example, fighter airplanes can accommodate an adequate weapons load only by using two alternative techniques, both of which impose undesirable drag and signature penalties. First, the weapons can be carried externally, generally by attaching them to external pylons.

However, carrying the weapons externally creates a great deal of drag, and the exposed weapons enlarge the signature of the aircraft. Second, the weapons can be carried in an internal weapons bay, traditionally located along the bottom of such airplanes. Carrying weapons in an internal weapons bay avoids the drag and radar signature penalties incurred in carrying the weapons externally. However, an adequate weapons load often can be carried only by using relatively wide weapons bays which have a tendency to make the frontal aspects of such airplanes larger than the combined frontal aspects of the canopy, forward-looking radar dome and engine air inlets. Thus, regardless of which conventional technique is used, adequate weapons loads generally can be carried only by increasing the aerodynamic drag and radar signature of such aircraft.

The need to minimize the radar signature of modern fighter aircraft imposes other constraints on the layout of the aircraft's components. For example, the aircraft's engine faces should be shielded from external view because their rotating parts, particularly their turbine compressor blades, generate relatively large radar signatures. Radar shielding of the engine is normally accomplished by either mounting blocking devices, such as fins, in the inlet ducts or by using curved, relatively long inlet ducts that provide complete line-of-sight blockage of the engine face from any angle. Blocking devices can have a tendency to interfere with the flow of combustion air through the inlet ducts. Long, curved inlet ducts are also undesirable. The length of inlet ducts needed to achieve complete line-of-sight blockage is a function of the degree of curvature of the inlet ducts. Shorter inlet ducts require a greater degree of curvature to adequately shield the engine faces. However, in order for inlet ducts to be of sufficient length to completely shield the engine faces from external view, the inlet ducts must generally pass through the fuselage near the aircraft's center of gravity. Passing relatively large inlet ducts through the airplane's center of gravity has the effect of making it more difficult to position the weapons bay and landing gear at the center of gravity. Relatively long, curved inlet ducts are also undesirable for other reasons. Long, curved inlet ducts can impede the flow of combustion air to the engines. Relatively long engine inlet ducts can also unduly increase the weight; of airplanes, particularly since the structural capabilities of the ducts cannot be used. Instead, the ducts generally serve the sole purpose of guiding inlet air to the engines.

It is thus apparent that modern fighter aircraft design involves a number of competing design goals, including the positioning of certain components at the aircraft's center of gravity, minimizing the frontal aspect of the aircraft, shielding the faces of the aircraft's engines from external view and minimizing the aircraft's weight. Conventional wisdom holds that it is not possible to achieve all of these design goals, and that some of these design goals must be compromised for the sake of other design goals.

SUMMARY OF THE INVENTION

It is an object of the invention to provide a fighter aircraft having relatively low drag and a relatively low radar signature.

It is another object of the invention to provide a fighter aircraft that is capable of carrying an adequate weapons load without causing aerodynamic drag or radar signature penalties.

It is another object of the invention to provide a fighter aircraft having its weapons and landing gear located near its center of gravity without causing aerodynamic drag or radar signature penalties.

is another object of the invention to provide a fighter aircraft having its engine face(s) shielded from external view without imposing undesirable drag, performance or signature penalties.

It is still another object of the invention to deploy lock-on-before-launch weapons in positions where they have a relatively wide field of view.

It is a further object of the invention to utilize airplane components configured for low drag and signature as structural components in order to minimize the weight of the airplane.

These and other objects of the invention are provided by a fighter aircraft having a fuselage, at least one jet engine, an air intake for each jet engine, an air intake duct extending from each air intake to a respective engine, a forward looking radar mounted behind a forward radar dome, a transparent pilot canopy and retractable landing gear. The aircraft is specially adapted to internally carry relatively long missiles, generally using a lock-on-after-launch guidance system, and relatively short missiles, generally using a lock-on-before-launch guidance system. The configuration of the above components allows the aircraft's aerodynamic drag and radar signature to be minimized without sacrificing flight performance. Specifically, the aircraft includes a main weapons bay opening through the bottom of the aircraft's fuselage substantially at its center of gravity. The main weapons bay houses the relatively long missiles. A pair of auxiliary weapons bays opening through opposite sides of the fuselage at or near the aircraft's center of gravity house the relatively short missiles. The main landing gear is positioned slightly behind the aircraft's center of gravity when the landing gear is down. When the landing gear is retracted, it is stowed in respective wells located behind the auxiliary weapons bays in substantial longitudinal alignment with the auxiliary weapons bay. At least one engine intake duct extends from a respective air intake forward of the wings and the center of gravity of the aircraft to a respective engine mounted behind the aircraft's center of gravity. Each engine intake duct curves upwardly above the main weapons bay as it passes through the fuselage to shield the face of the engine from external view and minimize the width of the aircraft. The auxiliary weapons bays and relatively short missiles are preferably supported by the outer walls of respective intake ducts so that the intake ducts are used as structural members to support the auxiliary weapons bays and relatively short missiles. Similarly, the main weapons bay and relatively long missiles are supported by the lower wall of each intake duct so that the intake duct(s) are used as structural members to support the main weapons bays and relatively long missiles. The relatively short weapons are mounted on launch means in the auxiliary weapons bays for deploying the relatively short missiles outboard of the fuselage prior to launch. The forward ends of the relatively short missiles are positioned forward of the leading edges of the wings to provide a relatively large field of view for the lock-on-before launch guidance sensors generally mounted in the forward ends of such missiles. As a result of the above described configuration, the frontal aspect of the aircraft can be reduced to essentially the combined frontal aspects of the canopy, the air intake ( s ) and the forward radar dome thereby minimizing the aerodynamic drag and radar signature of the aircraft.

DETAILED DESCRIPTION OF THE PREFERRED EMBODIMENTS

Figure 1:
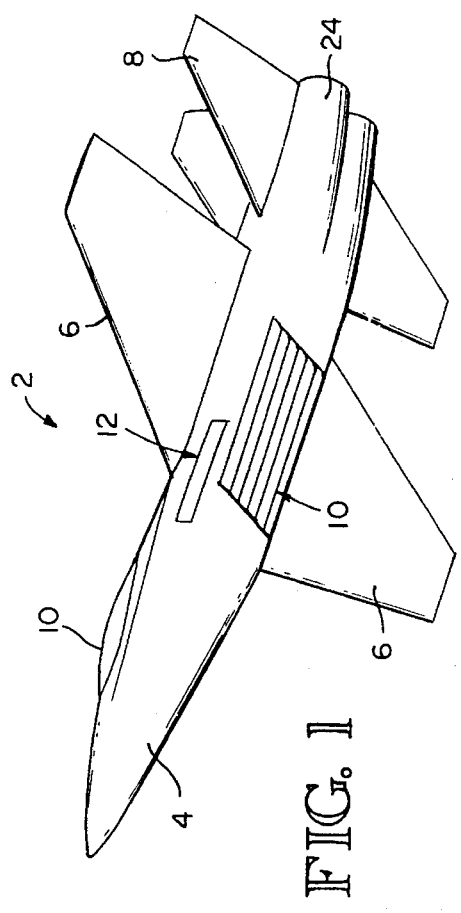
FIG. 1 is an isometric view of a fighter aircraft configured to provide minimum aerodynamic drag and radar signature without compromising flight performance.

A modern fighter aircraft 2, as illustrated in FIG. 1, includes a fuselage 4 having a pair of wings 6, a tail 8, and a transparent pilot canopy 10. A main weapons bay (described further below) enclosed by doors 10 is located along the underside of the fuselage 4. An auxiliary weapons bay (also described further below) covered by a door 12 is located on each side of the fuselage 4 forward of the wings 6.

Figure 2:
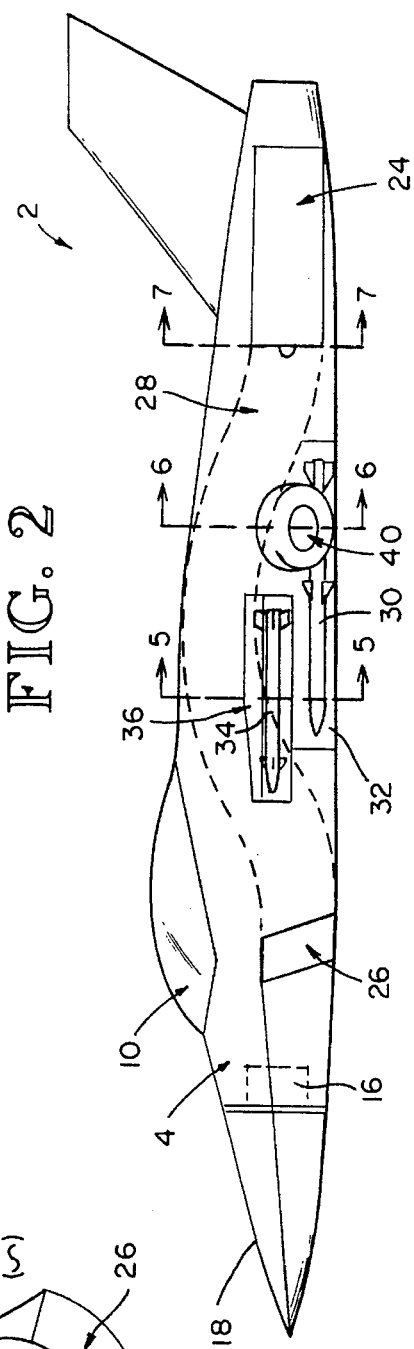
FIG. 2 is a side elevational view of a fighter aircraft showing the placement of its canopy, forward radar dome, engine, engine intake ducts, landing gear and weapons.

As further illustrated in FIG. 2, the forward portion of the fuselage 4 includes a forward looking radar 16 positioned behind a conical radar dome 18. The flight crew of the airplane 2 are seated in the fuselage 4 beneath the transparent canopy 10. A pair of engines 24 mounted at the rear of the airplane 2 receive combustion air from respective air intakes 26 through intake ducts 28. The intakes 26 are located forward of the wing 6 (FIG. 1) while the engines 24 are located well behind the wing.

Fighter aircraft generally carry several varieties of weapons ranging in size from relatively short missiles to substantially longer missiles. The longer missiles are generally of the radar guided type in which the radar can acquire or "lock-on" to the target after launch. These missiles are therefore known as "lock-on-after-launch" missiles. The shorter missiles generally use a heat seeking guidance system in which their infa-red sensors must acquire or "lock-on" to the target before launch. These missiles are therefore known as "lock-on-before-launch" missiles. As mentioned above, it is important for the missiles, as well as the airplane's main landing gear, to be located near the airplane's center of gravity while minimizing the airplane's aerodynamic drag and radar signature. It has been discovered that all of these design goals can be achieved by taking advantage of the diversity in the size and operating characteristics of the weapons typically carried by fighter aircraft.

Figure 3:
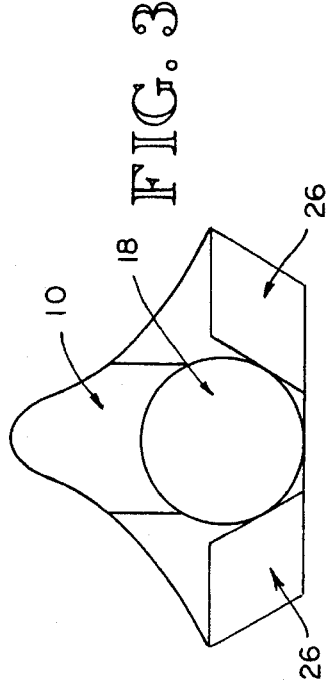
FIG. 3 is a front elevational view of the fighter aircraft of FIG. 2.
Figure 4:
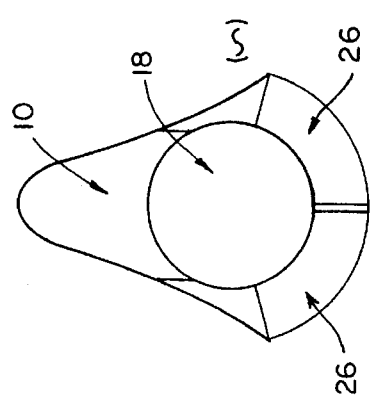
FIG. 4 is a front elevational view of an alternative embodiment of the fighter aircraft of FIG. 2.

As illustrated in FIG. 2, longer missiles 30 are carried in a main weapons bay 32 that is located on the underside of the airplane 2. Shorter missiles 34 are carried separately from the longer missiles 30 in auxiliary weapons bays 36 that are located along the sides of the fuselage 4. Carrying the longer missiles 30 at a location that is different from where the shorter missiles 34 are carried allows all of the significant goals of designing fighter aircraft to be achieved for a number of reasons. First, removing the shorter missiles 34 from the main weapons bay 32 allows the width of the main weapons bay 32 to be minimized since the weapons bay 32 need only be wide enough to accommodate the longer missiles 30. As a result, the width, and hence frontal aspect, of the airplane 2 can be minimized to minimize the airplane's aerodynamic drag and radar signature. As illustrated in FIG. 3, placing the shorter missiles 34 in an auxiliary weapons bay 36 allows the frontal aspect of the airplane 2 to consist essentially of the engine intakes 26, the flight crew canopy 10 and the forward radar dome 18. Alternatively, the engine intakes 26 may be positioned beneath the airplane 2, as illustrated in FIG. 4, so that the frontal aspect of the airplane 2 also consists essentially of the engine intakes 26, the flight crew canopy 10 and the forward radar dome 18. As mentioned above, the engine intakes 26, canopy 10 and forward radar dome 18 are the major components of a fighter aircraft that must have a forward aspect. Providing other components with a frontal aspect unnecessarily increases drag and radar signature.

Figure 5:
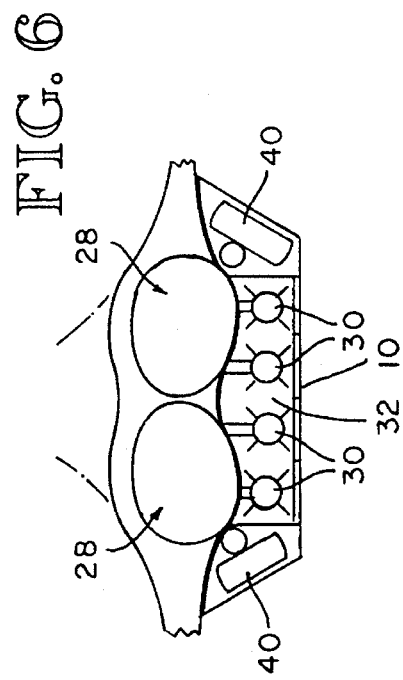
FIG. 5 is a cross-sectional view of the fighter aircraft of FIG. 2 taken along the line 5—5 of FIG. 2.
Figure 6:
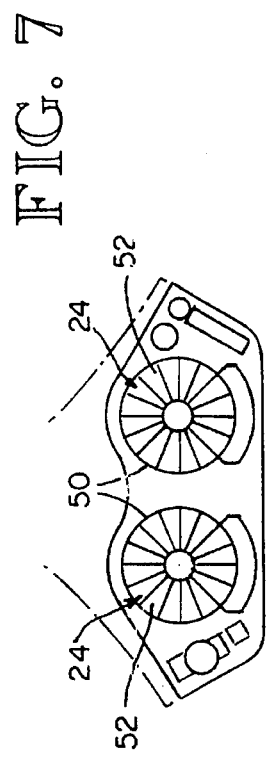
FIG. 6 is a cross-sectional view of the fighter aircraft of FIG. 2 taken along the line 6—6 of FIG. 2.

Another unexpected advantage of separating the longer missiles 30 from the shorter missiles 34 is that it allows all of the missiles 30, 34, as well as the landing gear, to be located at or near the aircraft's center of gravity. As illustrated in FIGS. 2, 5 and 6, the shorter missiles 34 can be positioned at or near the airplane's center of gravity and still allow the airplane's main landing gear 40 to be positioned behind the missiles 34 at its ideal location just aft of the aircraft's center of gravity. Even if the missiles 34 cannot be positioned right at the center of gravity, the relatively light weight inherent in their shorter length prevents them from significantly shifting the airplane's center of gravity after launch. As a result, the flight characteristics of the airplane 2 does not change when the missiles 30, 34 are launched, and the airplane 2 can rotate for takeoff at relatively low speeds.

Figure 7:
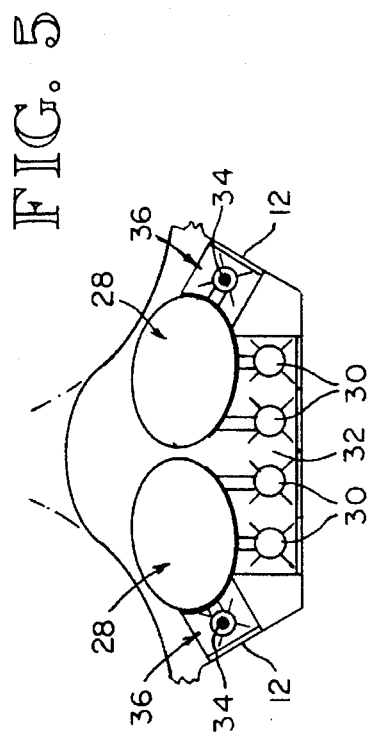
FIG. 7 is a cross-sectional view of the fighter aircraft of FIG. 2 taken along the line 7—7 of FIG. 2.

Separating the longer missiles 30 from the shorter missiles 34 also facilitates shielding of the engines 24 to minimize radar signature. As illustrated in FIG. 7, the engines 24 include a compressor turbine 50 having several circumferentially spaced turbine blades 52 adjacent to forward face of the engine 24. The shape of the turbine blades 52 coupled with their rotation at a high rate of speed, causes them to generate a relatively large radar signature. As a result, it is very important to shield the faces of the engines 24 from external view.

The faces of jet engines are typically not shielded from external view, which results in large radar returns from the engine's fixed and rotating parts. To shield the engine from external view requires optional features, all of which impose penalties in weight, aircraft cross-section, or drag. An example of such feature is the use of long, curved inlet ducts provided for the sole purpose of shielding the engine face from external view. Other examples of engine shielding devices include blocking devices mounted inside the inlet ducts, and flush mounted intakes which are not suitable for supersonic use.

The inventive fighter configuration uses long curved inlet ducts 28 that serve multiple functions not previously associated with inlet ducts. These functions include providing cavities for multiple weapons bays and landing gear stowage without increasing the cross-sectional area of the airplane, and providing structural walls for supporting weapons and other components.

The use of long, curved inlet ducts 28 to shield the faces of the engines 24 requires that the ducts 28 be routed through the fuselage past the aircraft's center of gravity. However, the aircraft's fuselage is normally very crowded at the aircraft's center of gravity because the weapons and the landing gear should be located there. The relatively large diameter of typical air intake ducts can make it difficult for the fuselage to accommodate the intake ducts, weapons and landing gear without increasing the size of the fuselage. Routing the intake ducts through the fuselage past the center of gravity without increasing the diameter of the fuselage can prevent the weapons and/or landing gear from being positioned at their optimum positions at or near the aircraft's center of gravity. Thus, there is normally a tradeoff between shielding the engine faces to minimize radar signature and locating the weapons and main landing gear at the center of gravity to maximize flight performance.

Figure 8:
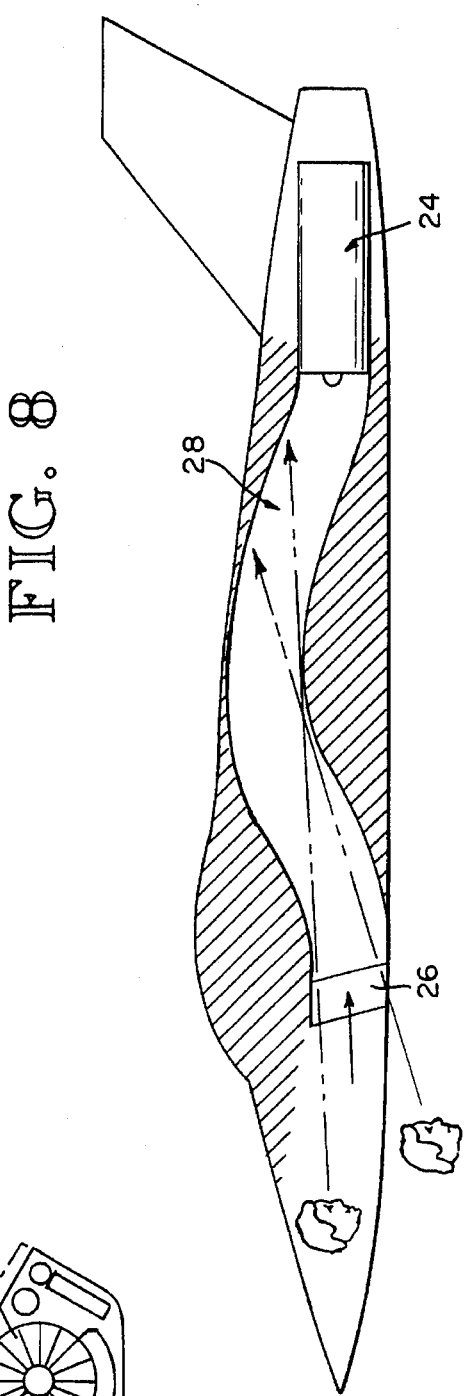
FIG. 8 is a longitudinal cross-sectional schematic of a fighter aircraft showing the routing of the engine intake ducts.
Figure 9:
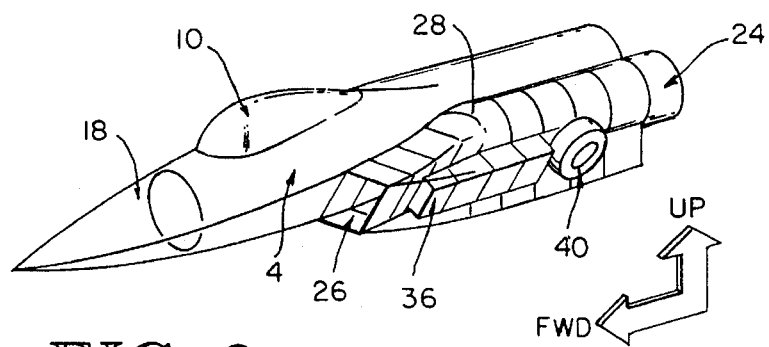
FIG. 9 is an isometric view of a fighter aircraft showing the location of its canopy, forward radar dome, engine intake ducts, auxiliary weapons bay and landing gear.
Figure 10:
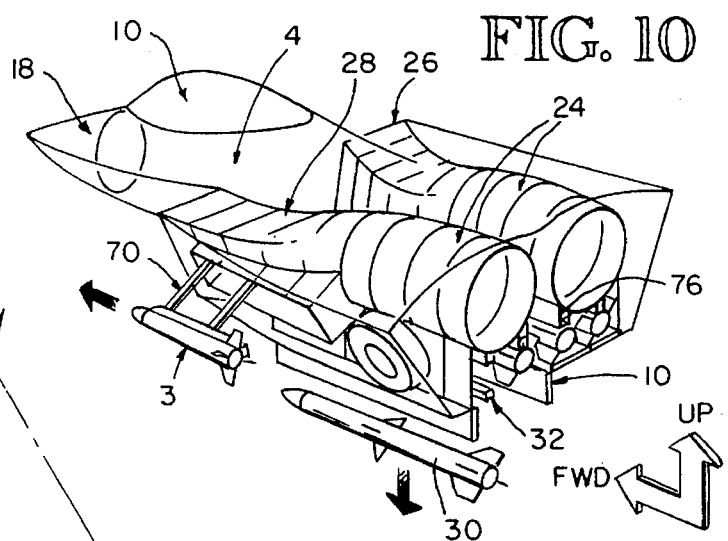
FIG. 10 is another isometric view of a fighter aircraft showing the location of its canopy, forward radar dome, engine intake ducts, auxiliary weapons bay and landing gear.
Figure 12:
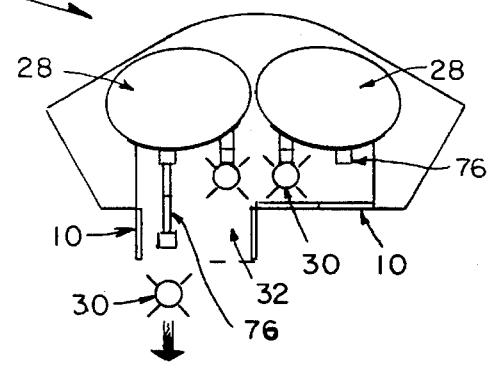
FIG. 12 is a cross-sectional schematic showing the transverse position of the engine intake ducts and the deployed position of the weapons carried in main weapons bays.

The inventive fighter configuration, as best illustrated in FIGS. 8, 9 and 12, shields the faces of the engines 24 while allowing the weapons 30, 34 and main landing gear 40 to be positioned at the center of gravity without increasing fuselage diameter by curving the intake ducts 28 upwardly above the main weapons bay 32 and above and inside the auxiliary weapons bay 36 and landing gear 40. The intake ducts 28 also preferably curve inwardly from front-to-rear, as best illustrated in FIG. 10, to further increase the shielding of the engine faces and to allow the engines 24 to be closer together to minimize asymmetric thrust in the event of a single engine failure.

Figure 11:
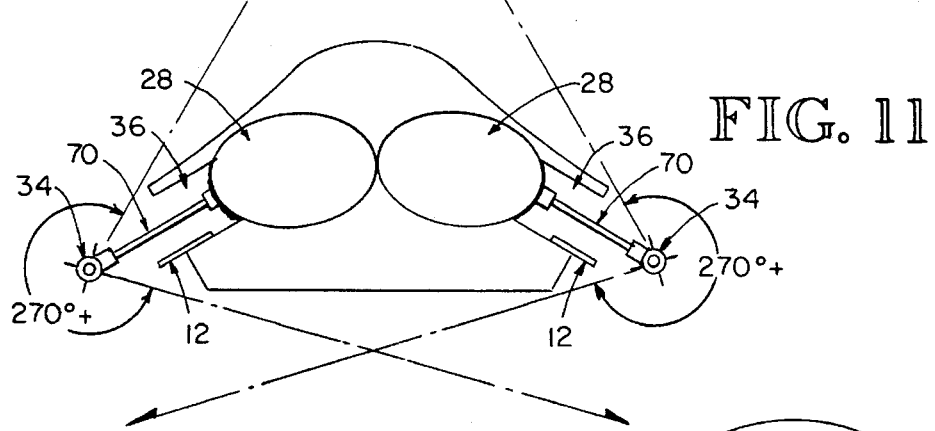
FIG. 11 is a cross-sectional schematic showing the transverse position of the ,engine intake ducts and the deployed position of the weapons carried in auxiliary weapons bays.

The relatively long length of intake ducts capable of adequately shielding engine faces from external view makes such ducts fairly heavy. However, since it is important to minimize the weight of fighter aircraft, it is desirable to minimize the weight penalty incurred in using long intake ducts. The inventive fighter configuration preferably minimizes this weight penalty by using the ducts 28 as structural members for the airplane 10. As best illustrated in FIGS. 9, 10 and 11, the side walls of the ducts 28 are used as structural members to support the auxiliary weapons bay 36, heat seeking missiles 34, launch mechanism 70 for the missiles 34, and doors 12 enclosing the auxiliary weapons bay 36. Similarly, as best illustrated in FIGS. 10 and 12, the bottom walls of the intake ducts 28 are used as structural members to support the main weapons bay 32, radar guided missiles 30, launch mechanism 76 for the missiles 30 and doors 10 enclosing the weapons bay 32.

A further advantage of placing the shorter missiles 34 in the auxiliary weapons bay 36 and out of the main weapons bay 32 is that the field of view of the missiles 34 is wider at the side of the fuselage 4 than it is at the bottom. This advantage is particularly important because the shorter missiles 34 are generally of the lock-on-before-launch variety in which a wide field of view when the missiles are deployed is particularly important. In contrast, the relatively small field of view of missiles deployed from the main missiles bay 32 is not a significant problem for the larger missiles 30 because these missiles are generally of the lock-on-after-launch variety and can acquire their target after they are dropped from the launch mechanism 70.

As best illustrated in FIG. 11, the shorter missiles 30 have a field of view that extends laterally over an angle of at least 270 degrees since the auxiliary weapons bays 36 are located forwardly of the wings 6 so that the wings do not block the missiles' view. The nose of the airplane 2 converges rapidly in front of the auxiliary weapons bays 36 to further increase the field of view of the missiles 34. The missiles 34 thus have a combined field of view of 360 degrees as best illustrated in FIG. 11.

The inventive fighter aircraft configuration thus achieves all of the significant design goals required to minimize aerodynamic drag and radar signature without sacrificing the performance of the aircraft. Although a specific embodiment of the aircraft has been illustrated herein, it will be apparent to one skilled in the art that the inventive configuration if applicable to other embodiments. For example, although the aircraft illustrated herein uses a pair of jet engines 24 having respective intakes 26 and inlet ducts 28, it will be understood that the aircraft may use a single jet engine with a single intake and inlet duct.

We claim:

1. A fighter aircraft, comprising:
   (a) a streamlined fuselage to provide low aerodynamic drag;
   (b) a pair of engines mounted in the fuselage;
   (c) one air intake duct for each engine; each intake being mounted forward on the fuselage;
   (d) an air intake duct for each engine connecting the respective air intake with the respective engine,
   wherein each air intake duct (i) curves upward and inward from the air intake to the respective engine; (ii) provides structural support for a main weapons bay mounted in the fuselage, through a wall that is common with or adjacent to the main weapons bay, the main weapons bay including a plurality of doors opening in the bottom of the fuselage; and (iii) also provides structural support for a respective auxiliary weapons bay through a wall that is common with or adjacent to the respective auxiliary weapons bay, wherein the auxiliary weapons bays is mounted in the fuselage ahead and outboard of the main weapons bay, each auxiliary weapons bay including an auxiliary weapons bay door opening in the side of the fuselage, the auxiliary weapons bay door being substantially conformal with the fuselage exterior when the door is closed; and wherein each auxiliary weapons bay is positioned immediately behind the air intake in the space created in the fuselage cross-section by the curving duct; and
   (e) at least one weapons launcher mounted in each weapons bay on a weapons bay wall common with or adjacent to the duct and opposite the door of that weapons bay, the launcher being adapted to eject a weapon from the bay through an aperture resulting when the weapons bay door is opened,
   wherein the arrangement of the main weapons bay, auxiliary weapons bays, and ducts provide a fuselage of substantially constant cross-section from the air intakes aft.

2. The aircraft of claim 1 further comprising one main landing gear on each side of the fuselage mounted in the fuselage to retract into the fuselage into a cavity outboard of the main weapons bay and immediately aft of the respective auxiliary weapons bay.

3. The aircraft of claim 2 wherein the launcher for each auxiliary weapons bay is adapted to extend outboard beyond the side of the fuselage to position the weapon mounted on that launcher so that, before launch, the weapon has an enhanced field of view of at least about 270 deg and so that the two auxiliary weapons together have a combined field of view of a full 360 deg.

4. The aircraft of claim 3 further comprising a forward radar dome and a forward looking radar behind the radar dome, the dome being mounted forward of the fuselage ahead of and between the air intakes.

5. The aircraft of claim 3 wherein the launcher for each auxiliary weapons bay holds a weapon and wherein the launcher positions its mounted weapon forward of the leading edge of a wing mounted on the fuselage, thereby providing guidance sensors in the forward end of such weapon with the filed of view before launch.

6. The aircraft of claim 1 wherein the duct wall provides structural support through a wall that is common with a wall of the respective weapons bay.

7. A fighter aircraft, comprising:
   (a) a fuselage having a longitudinal axis, a pair of air intakes symmetrically spaced in relation to the longitudinal axis, one air intake on each side of the longitudinal axis adjacent to the forward section of the fuselage, and containing a center of gravity for the aircraft; the fuselage having a substantially constant cross-section aft of the air intakes;
   (b) a main weapons bay in the fuselage bridging the longitudinal axis, the bay including a plurality of doors opening through the bottom external surface of the fuselage;
   (c) a pair of auxiliary weapons bays symmetrically positioned in the fuselage ahead and outboard of the main weapons bay with one auxiliary weapons bay on each side of the longitudinal axis, each bay including a door opening through the outboard side external surface of the fuselage;
   (d) a pair of main landing gear symmetrically positioned in the fuselage with one landing gear on each side of the longitudinal axis, each landing gear being immediately aft of the respective auxiliary weapons bay, outboard of the main weapons bay and behind the center of gravity;
   (e) two, separate, serpentine inlet ducts symmetrically positioned in the fuselage, each duct directing air from a respective air intake to a respective engine mounted in the rear of the fuselage behind the main weapons bay, each duct curving inwardly to define a cavity in the fuselage for the respective auxiliary weapons bay, curving upwardly over the main weapons bay, and, finally, curving downwardly to the engine; each duct providing structural support for both the respective auxiliary weapons bay and main weapons bay through a wall adjacent to the respective bay and shielding the respective engine from frontal view; and
   (f) launch means mounted in each weapons bay on a wall of the weapons bay adjacent the duct, the launch means being adapted for holding a respective missile in the weapons bay.

8. The aircraft of claim 7 wherein the launch means for the auxiliary weapons bays are adapted to position the missile outboard of the side of the fuselage ahead of a wing mounted on the fuselage to provide a large field of view for the missile before launch.

9. The aircraft of claim 8 wherein the field of view is at least about 270 deg for each missile, together the missiles having a full 360 deg field of view.

10. The aircraft of claim 7 further comprising:
    (a) a canopy mounted on the top of the fuselage between the air intakes; and
    (b) a forward radar dome projecting forward from the fuselage beneath the canopy and between the air intakes;
    wherein the frontal aspect of the aircraft with respect to aerodynamic drag and radar signature is defined substantially by the canopy, radar dome, and air intake.

11. A fighter aircraft having a fuselage of substantially constant cross-section, a wing connected to the fuselage, a pair of jet engines positioned in the aft of the fuselage, an air intake for each jet engine mounted forward on the fuselage, an air intake duct extending from each air intake to a respective engine, a forward looking radar mounted behind a forward radar dome projecting forward from the fuselage, a transparent pilot canopy mounted atop the fuselage between the air intakes, a pair of main landing gear, relatively long missiles and relatively short missiles, further comprising:

(a) a main weapons bay including a plurality of mechanized doors opening through the bottom external surface of the fuselage, the relatively long missiles being carried in the main weapons bay;

(b) a pair of auxiliary weapons bays, one bay on each side of the fuselage, each bay including at least one mechanized door opening through a respective side of the fuselage; the relatively short missiles being carried in the auxiliary weapons bays; and (c) a pair of landing gear mounting means for positioning the main landing gear slightly behind the center of gravity of the aircraft when the landing gear is down and for positioning the landing gear in the fuselage when stowed during flight, one of the pair being behind and in substantial longitudinal alignment with each respective auxiliary weapons bay, wherein each engine intake duct extends from a respective air intake forward of the wing and the center of gravity of the aircraft to a respective engine mounted behind the center of gravity of the aircraft, the engine intake duct extending through the fuselage and curving inwardly inboard of the respective auxiliary weapons bay, upwardly above the main weapons bay, and downwardly thereafter to the respective engine to shield the engine from external frontal view and to minimize the width of the aircraft, wherein each duct provides structural support for the respective auxiliary weapons bay and for the main weapons bay through a wall of the duct that is common with or adjacent to the respective bay, and wherein at least one launch means is mounted in each weapons bay on the wall opposite the mechanized door for the bay.

12. The aircraft of claim 11 wherein the launch means for each auxiliary weapons bay is adapted for positioning the respective short missile forward of a leading edge of the wing so that the missile has an enhanced field of view of at least about 270 deg with a combined field of view for missiles from both auxiliary weapons bays of a full 360 deg.

13. A fighter aircraft having low aerodynamic drag and low radar signature, comprising:

(a) a streamlined fuselage of substantially constant center cross-section;

(b) a pair of air intakes mounted on the forward section of the fuselage;

(c) a radar dome mounted on the forward face of the fuselage between the air intakes, wherein the two air intakes and radar dome together define the width of the fuselage;

(d) a pair of engines mounted in the rear of the fuselage;

(e) a pair of auxiliary weapons bays mounted on opposite sides in the fuselage so that a door for each auxiliary weapons bay opens in the respective side of the fuselage and closes conformal with the side of the fuselage;

(f) a main weapons bay mounted in the fuselage below symmetrically positioned air intake ducts between the auxiliary weapons bays and extending aft thereof, the bay including a plurality of independently operable doors opening in the bottom of the fuselage and closing to be conformal with the fuselage bottom;

(g) a pair of air intake ducts extending through the fuselage from the air intakes to the engines, each duct curving inwardly around the auxiliary weapons bay, upwardly over the main weapons bay, and downwardly to the engine to shield the engine front face from external frontal view and to minimize the width of the fuselage;

(h) a wing mounted on the fuselage;

(i) "lock-on-before-launch" missiles, each missile having a missile longitudinal axis, each missile carded on respective launch mechanisms mounted in each auxiliary weapons bay and extensible outboard of the fuselage ahead of the wing to provide a wide field of view; and (j) long missiles carried on respective launch mechanisms mounted in the main weapons bay for ejection through an aperture created in the bottom of the fuselage when the respective bay door is opened;

wherein the air intake ducts provide structural support for the auxiliary weapons bays and main weapons bay through a duct wall common with or adjacent to the respective bay to minimize the overall weight of the aircraft.

14. The aircraft of claim 13 further comprising one main landing gear on each side of the fuselage mounted in the fuselage to retract into the fuselage into a cavity outboard of the main weapons bay and immediately aft of the respective auxiliary weapons bay.

15. The aircraft of claim 13 wherein the launch mechanism for each auxiliary weapons bay is adapted to extend outboard beyond the side of the fuselage to position the missile so that, before launch, the missile has a spherical sector forward field of view of at least about 270 deg about the missile longitudinal axis and so that the two auxiliary missiles together have a combined spherical sector forward field of view of a full 360 deg.

16. The aircraft of claim 15 wherein the fuselage cross-section has a substantially flat bottom and sloping sides substantially as shown in FIGS. 5, 6, and 7.

* * * * *